Sept. 29, 1959   E. S. STODDARD   2,906,684
WATER DEMINERALIZING UNITS
Filed Jan. 30, 1956   3 Sheets-Sheet 1

INVENTOR.
Edgar S. Stoddard
BY
Attys.

United States Patent Office 2,906,684
Patented Sept. 29, 1959

2,906,684

WATER DEMINERALIZING UNITS

Edgar S. Stoddard, Berwyn, Ill., assignor to General Electric Company, a corporation of New York Application January 30, 1956, Serial No. 562,202

17 Claims. (Cl. 204—229)

The present invention relates to water demineralizing units and more particularly to improved units of the general character disclosed in the copending application of Edgar S. Stoddard and Dominic J. Vallino, Serial No. 518,858, filed June 29, 1955, that are especially designed to be incorporated directly in existing home water supply systems with only minimum plumbing changes.

In hard-water areas, the raw water supply is altogether unsuitable for many purposes, and is particularly unsuitable for washing operations, since the calcium and magnesium ions of the corresponding salts dissolved therein effect the precipitation of calcium and magnesium salts of higher fatty acids (oleates, palmates, etc.) derived from soap products employed in such washing operations.

In order to minimize the precipitation of the calcium and magnesium salts of such higher fatty acids in washing operations, ion exchange apparatus of the zeolite type is generally employed in home water supply systems in hard-water areas; which apparatus effects the exchange or substitution of sodium ions for calcium and magnesium ions in the raw water, since the sodium salts of such higher fatty acids are much more soluble than the corresponding calcium and magnesium salts thereof. However, such apparatus does not demineralize the raw water in the general sense of reducing the total dissolved solids count therein, rather it only softens the raw water in the special sense of substituting sodium ions for calcium and magnesium ions therein.

Now while this type of softening of raw water is highly useful in some washing operations, it is of only limited utility in other washing operations. For example, in automatic dishwashing apparatus frequently the final step involves subjecting the dishes to a blast of hot air to effect drying of the water remaining thereon following the preceding rinsing step; whereby glassware is visibly spotted by salt deposits thereon in the event the total dissolved solids count of the rinse water is high, even though the rinse water has been treated by ion exchange apparatus of the zeolite type to effect softening thereof. Moreover, there are other chemical reactions that are carried out in the presence of water, wherein the sodium ions that are introduced into the treated water by such ion exchange apparatus, are far more objectionable than the calcium or magnesium ions contained in the raw water.

Accordingly, it is a general object of the invention to provide a unit for treating raw water that is especially designed for use in a home water supply system and that effects demineralization of the water, as contrasted with the substitution of sodium ions for calcium and magnesium ions, whereby the total dissolved solids count of the water is substantially reduced.

Another object of the invention is to provide a water demineralizing unit of the character noted that is entirely automatic, requiring no re-charging or other care by the home owner.

Another object of the invention is to provide a water demineralization unit of improved and simplified construction and arrangement and that is economical in operation.

A further object of the invention is to provide a water demineralizing unit of compact and simple construction and arrangement, but having a latent ion exchange capacity equivalent to the normal daily requirements of hot water in a home.

A still further object of the invention is to provide a water demineralizing system incorporating a water demineralizing unit of the character described and an improved and simplified automatic control system therefor.

Further features of the invention pertain to the particular arrangement of the elements of the water demineralizing unit and of the automatic control system therefor, whereby the above-outlined and additional operating features thereof are attained.

The invention, both as to its organization and method of operation, together with further objects and advantages thereof, will best be understood by reference to the following specification taken in connection with the accompanying drawings, in which.

Figures 1, 2:
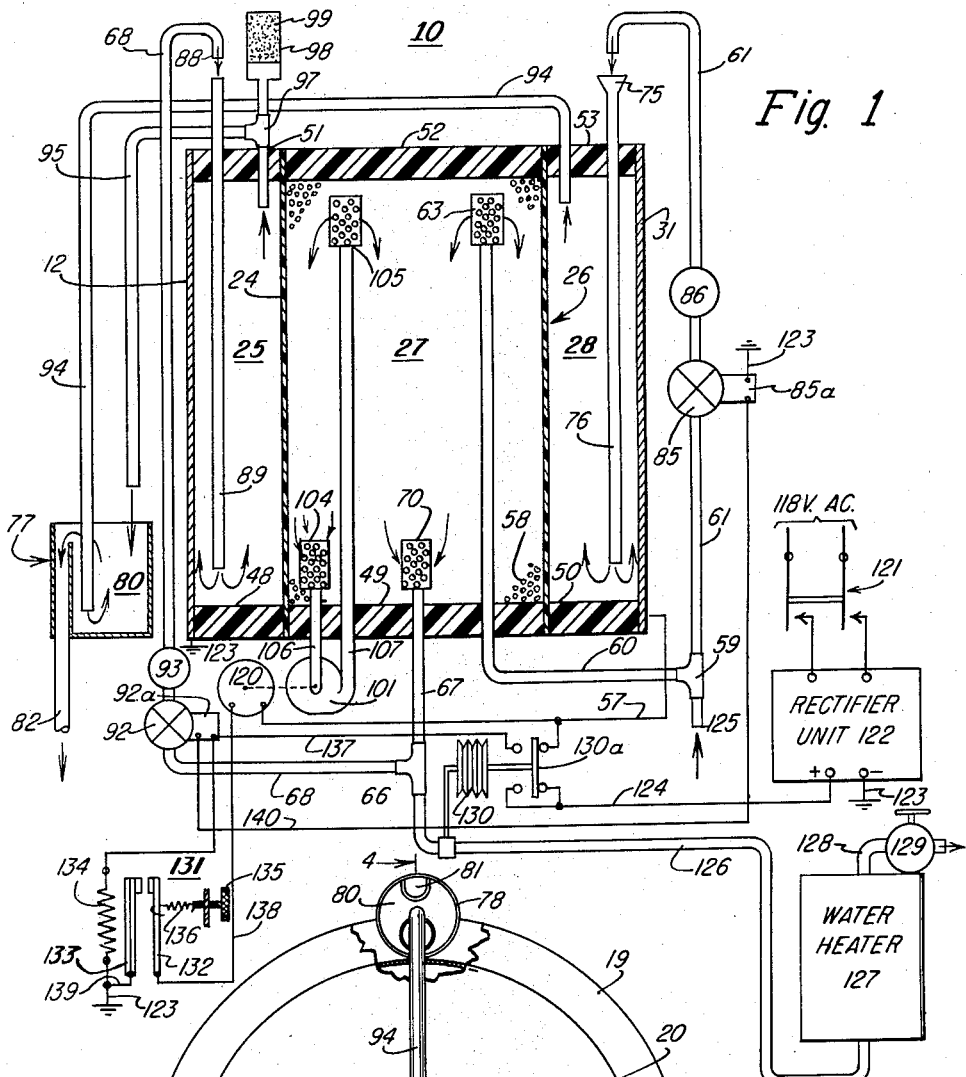
Figure 1 is a diagrammatic illustration of a water demineralizing unit, together with the associated water supply system and the automatic control system therefor, and embodying the present invention.
Fig. 2 is a plan view, partly broken away, of the water demineralizing unit.
Figure 3:
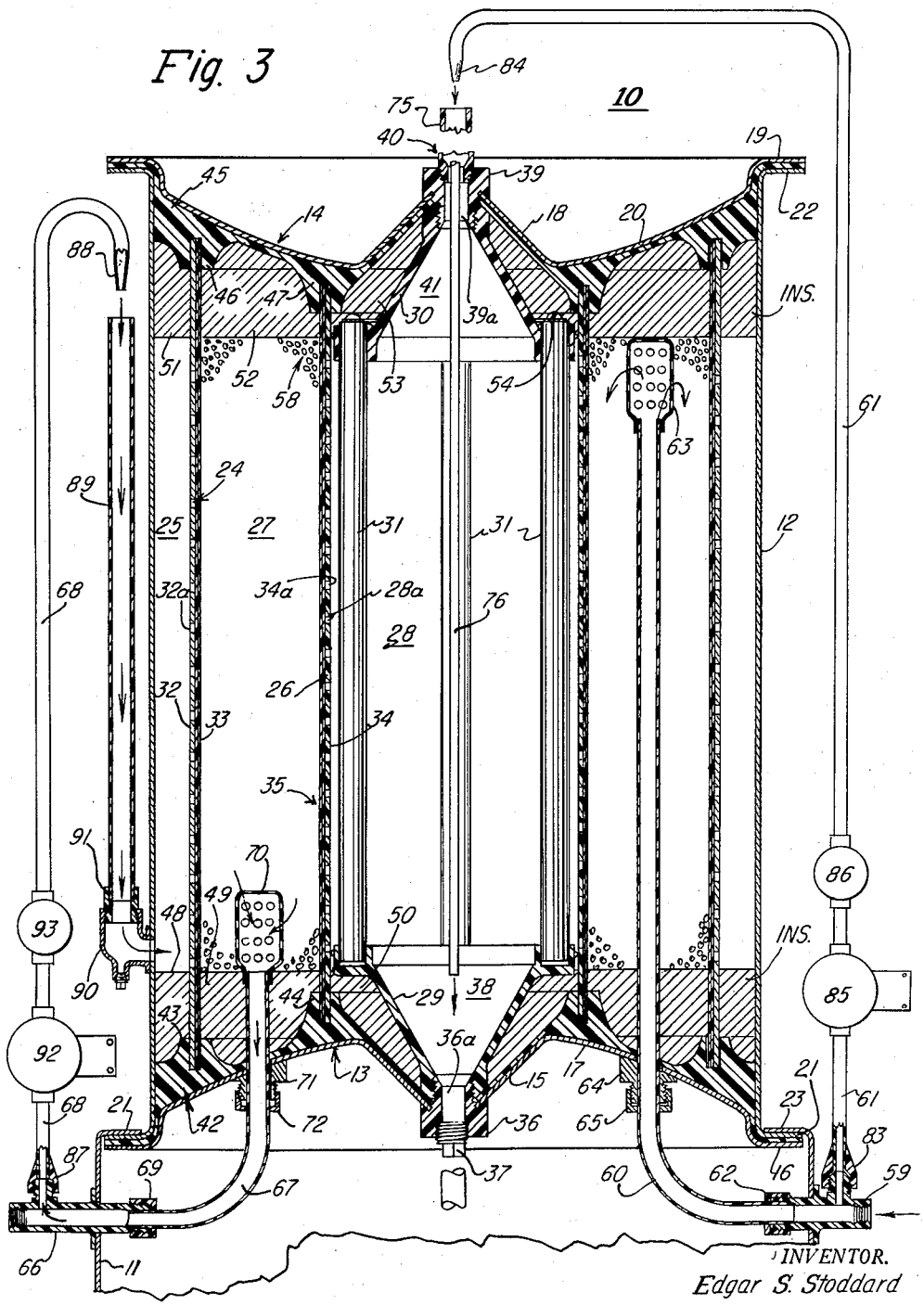
Fig. 3 is an enlarged fragmentary vertical sectional view of the water demineralizing unit, taken in the direction of the arrows along the line 3—3 in Fig. 2.
Figure 4:
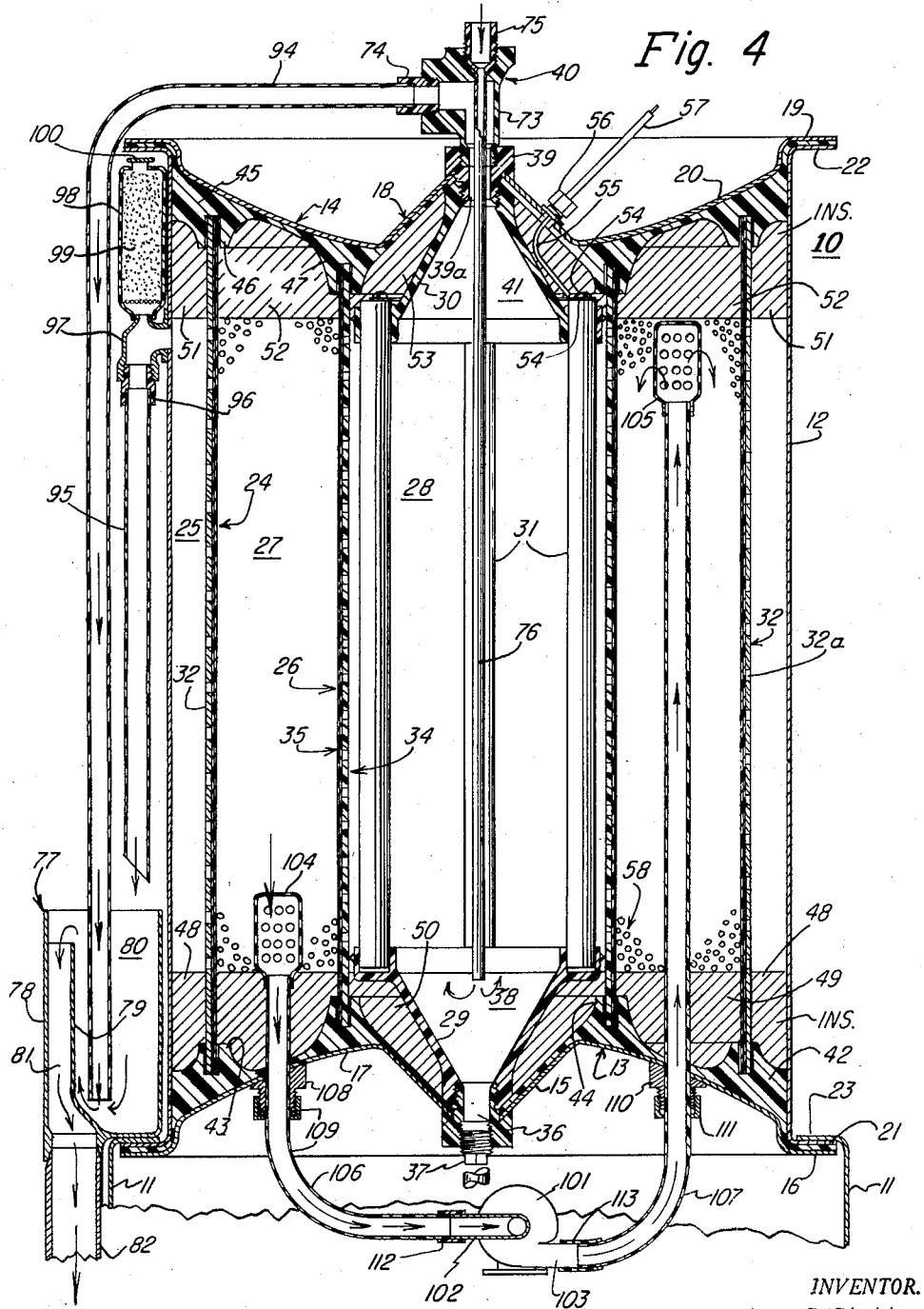
Fig. 4 is another enlarged fragmentary vertical sectional view of the water demineralizing unit, taken in the direction of the arrows along the line 4—4 in Fig. 2.

Figs. 3 and 4 comprise similar vertical sectional views taken at right angles to each other through the upstanding water demineralizing unit, as respectively indicated by the section lines 3—3 and 4—4 in Fig. 2.

Referring now to Figs. 2 to 4, inclusive, of the drawings, the water demineralizing unit 10 there illustrated and embodying the features of the present invention comprises an upstanding substantially drum-like base 11, an upstanding substantially cylindrical body 12, a substantially disk-like bottom header 13 and a substantially disk-like top header 14; which elements are preferably formed of mild steel. The headers 13 and 14 are substantially identical; the bottom header 13 is of general concave configuration including a central downwardly directed conical section 15, an outwardly directed marginal flange section 16 and an intermediate upwardly directed connecting section 17; and the upper header 14 is of general concave configuration including a central upwardly directed conical section 18, an outwardly directed marginal flange section 19 and an intermediate downwardly directed connecting section 20. The respective lower and upper ends of the body 12 are provided with outwardly directed marginal flanges 21 and 22; the lower header 13 is arranged in the lower end of the body 12 with the flanges 16 and 21 suitably secured together; and the upper header 14 is arranged in the upper end of the body 12 with the flanges 19 and 22 suitably secured together. Also, the flange 21 is suitably secured to an inwardly directed marginal flange 23 provided upon the top of the base 11 for purposes of support.

Also, the unit 10 comprises a first upstanding substantially cylindrical barrier 24 arranged within the body 12 and spaced inwardly with respect thereto and cooperating therewith to define an upstanding substantially annular chamber 25 therebetween, and a second upstanding substantially cylindrical barrier 26 arranged within the first barrier 24 and spaced inwardly with respect thereto and cooperating therewith to define an upstanding substantially annular chamber 27 therebetween. Moreover, the second barrier 26 defines an upstanding substantially cylindrical chamber 28 therein. In the arrangement, the elements 12, 24 and 26 are disposed in concentric relationship, whereby the upstanding chambers 25, 27 and 28 are disposed in this relation. Arranged within the chamber 28 are upper and lower substantially conical insulating members 30 and 29 that carry a plurality of upstanding substantially rod-like conducting e'ements 31 disposed in a substantially annular array adjacent to and inwardly of the upstanding second barrier 26. In the arrangement, the element 12 comprises a cathode and the elements 31 comprise anodes; whereby the upstanding chamber 25 disposed between the cathode 12 and the barrier 24 constitutes a catholyte chamber, the upstanding chamber 27 disposed between the two barriers 24 and 26 constitutes a raw water treatment chamber, and the upstanding chamber 28 constitutes an anolyte chamber.

In the arrangement, the barrier 24 is of composite construction comprising an outer substantially sleeve-like supporting sheet 32 formed of mild steeel and an inner substantially sleeve-like diaphragm 33 formed of a number of layers or sheets of close-cellulose material, such, for example, as a sheet of wood wrapped within the supporting sheet 32. Similarly, the barrier 26 is also of composite construction comprising an inner substantially sleeve-like supporting sheet 34 formed of molded insulating material. such, for examp'e, as the methylmethacrylate resin sold under the trade name "Lucite" and an outer substantially sleeve-like diaphragm 35 formed of a number of layers or sheets of close-cellulose material, such, for examp'e, as a sheet of wood wrapped without the supporting sheet 34. Specifically, the diaphragms 33 and 35 may be formed from plywood selected from the class consisting of poplar, Douglas fir and white pine, poplar having been found to be more satisfactory. In the barriers 33 and 35, the seams between the adjacent edges of the sheets of wood are sealed with a suitable water insoluble cement, such as the rubber-like cement sold under the trade name "Plio-bond." In the barrier 24 suitable perforations 32a are formed in the supporting sheet 32: and likewise, in the barrier 26 suitable perforations 34a are formed in the supporting sheet 34. Accordingly, the composite structure of the barrier 24 is very advantageous as the strong outer steel sheet 32 prevents rupture of the inner wooden diaphragm 33 under the outward pressure of the water in the treatment chamber 27, as exp'ained more fully hereinafter, while the diaphragm 33 accommodates the passage therethrough of the cations involved in the electrodialysis, as explained subsequently; and likewise, the composite structure of the barrier 26 is very advantageous as the strong inner molded supporting sheet 34 prevents rupture of the outer wooden diaphragm 35 under the pressure of the water in the treatment chamber 27, as explained more fully hereinafter. while the diaphragm 35 accommodates the passage therethrough of the anions involved in the electrodialysis, as explained subsequently.

The member or lower anode holder 29 is formed of a suitable acid-resistant molded p!astic material such, for example. as a melamine resin and is disposed substantially within the bottom of the chamber 28 and secured in place within the conical section 15 of the bottom header 13 by an arrangement including a tubular insulating bushing 36 disposed in a centrally arranged opening provided in the section 15 and sealed in liquid-tight relation therewith; which bushing 36 is also formed of a suitable acid-resistant molded plastic material, such as a melamine resin. Specifically, the inner end of the bushing 36 is arranged in threaded engagement with the throat of the anode holder 29 and the outer end thereof projects to the exterior, the outer end of the bushing 36 carrying a suitable drain plug 37 closing the opening 36a provided in the bushing 36 and communicating with the lower portion of the hollow anode holder 29; whereby a sediment trap 38 is defined within the anode holder 29. The member or upper anode holder 30 is formed of a suitable acid-resistant molded plastic material, such, for examp!e, as a melamine resin and is disposed substantially centrally within the top of the chamber 28 and secured in place within the conical section 18 of the top header 14 by an arrangement including a tubular insulating bushing 39 disposed in a centrally arranged opening provided in the section 18 and sealed in liquid-tight relation therewith; which bushing 39 is also formed of a suitable acid-resistant molded plastic material, such as a melamine resin. Specifica!ly, the inner end of the bushing 39 is arranged in threaded engagement with the throat of the anode holder 30 and the outer end thereof projects to the exterior, the outer end of the bushing 39 carrying an upstanding insulating fitting 40 for a purpose more fully explained hereinafter, and closing the opening 39a provided in the bushing 39 and communicating with the upper portion of the hollow anode holder 30; whereby a dome 41 is defined within the anode holder 30.

A lower substantially disk-like insulating membrane 42 is carried by the inner surface of the lower header 13 and constituting a liner therefor, as well as a sealing stopper or plug; which membrane 42 is molded of a polymeric elastomer of rubber-like character such that it is resistant to attack both by acids and alkalies. Specifically, the membrane 42 may be formed of chloroprene or polyethylene but is preferably formed of the vinylidene chloride resin sold under the trade name "Saran." More particularly, the outer marginal portion of the member 42 terminates in an annular flange extending between the adjacent annular flanges 16 and 21; the inner marginal portion of the member 42 terminates in an annular flange extending between the lower anode holder 29 and the associated bushing 36; and the intermediate body portion of the membrane 42 terminates in two upstanding substantially concentric annular ridges or beads 43 and 44 that are slotted respectively to receive and to support the extreme lower ends of the barriers 24 and 26. Thus the membrane 42 seals the lower end of the chamber 25 both from the exterior and from the adjacent lower end of the chamber 27, and seals the lower end of the chamber 28 both from the exterior and from the adjacent lower end of the chamber 27.

An upper substantially disk-like insulating membrane 45 is carried by the inner surface of the upper header 14 and constituting a liner therefor, as well as a sealing stopper or plug; which membrane 45 is preferably of a construction identical to that of the membrane 42, as previously described. More particularly, the outer marginal portion of the membrane 45 terminates in an annular flange extending between the adjacent annular flanges 19 and 22; the inner marginal portion of the membrane 45 terminates in an annular flange extending between the upper anode holder 30 and the associated bushing 39; and the intermediate portion of the membrane 45 terminates in two depending substantially concentric annular ridges or beads 46 and 47 that are slotted respectively to receive and to support the extreme upper ends of the barriers 24 and 26. Thus the membrane 45 seals the upper end of the chamber 25 both from the exterior and from the adjacent upper end of the chamber 27, and seals the upper end of the chamber 28 both from the exterior and from the adjacent upper end of the chamber 27.

Further, concentric layers of insulating material 48, 49 and 50 are arranged in the bottoms of the respective chambers 25, 27 and 28; and likewise, concentric layers of insulating material 51, 52 and 53 are arranged in the tops of the respective chambers 25, 27 and 28; which layers or rings 48, 49, 50, 51, 52 and 53 are preferably formed of a long chain aliphatic hydrocarbon of wax-like character, such, for example, as ordinary paraffin wax and having a melting point at least as high as 180° F.; whereby the rings 48, 49 and 50 further seal and define the bottom ends of the chambers 25, 27 and 28, and the rings 51, 52 and 53 further seal and define the top ends of the chambers 25, 27 and 28.

In the arrangement, the anodes 31 may be formed of rods of carbon, or the like, extending between the anode holders 29 and 30, and the upper ends thereof are commonly connected together by a substantially ring-like bus 54 that is connected to an electric cable 55 extending to the exterior through a hole provided in the conical section 18 of the upper header 14; which hole is sealed by an associated fixture 56 carried by the section 18 in surrounding relationship with the cable 55. The cable 55 is, of course, insulated from the associated upper header 14 and the portion thereof disposed exteriorly of the fixture 56 is appropriately insulated as indicated at 57.

An upstanding substantially annular porous bed 58 is arranged within the chamber 27 substantially completely filling the same and extending between the barriers 24 and 26 and between the rings 49 and 52; the bed 58 comprising ion exchange material and accommodating the ready passage therethrough of the raw water undergoing treatment. More particularly, the bed 58 is of the mixed type comprising both cation exchange material and anion exchange material (heterogeneously mixed). Specifically, the ion exchange bed 58 essentially comprises a loosely packed mass of first discrete particles of cation exchange material (preferably a synthetic organic polymeric cation exchange resin) and of second discrete particles of anion exchange material (preferably a synthetic organic polymeric anion exchange resin), the two types of discrete particles mentioned being so proportioned that substantially equal cation exchange and anion exchange capacities are possessed by the bed 58. Also, it is noted that the bed 58 accommodates the ready passage therethrough of the raw water undergoing treatment without any substantial diminution of pressure between the raw water inlet conduit and the treated water outlet conduit, as explained more fully hereinafter.

More particularly, this cation exchange resin is of bead-like formation and may comprise the strong-acid resin sold under the name "Amberlite IR–120"; and this anion exchange resin is of bead-like formation and may comprise the strong-base resin sold by Rohm and Haas under the names "Amberlite IRA–400" and "Amberlite IRA–410". A cation exchange resin the type specified essentially comprises a stable insoluble synthetic organic polymer, active acidic functional groups chemically bonded thereto and dissociable into free mobile cations to impart a negative charge to the polymer, and water in gel relationship with the polymer. Similarly, an anion exchange resin of the type specified essentially comprises a stable insoluble synthetic organic polymer, active basic functional groups chemically bonded thereto and dissociable into free mobile anions to impart a positive charge to the polymer, and water in gel relationship with the polymer. The active acidic functional groups attached to the associated organic polymer are oriented with respect to the interfaces thereof so as to be partially or completely dissociable in the internal gel water into fixed negative ions linked to the polymer and into mobile exchangeable positive ions; and similarly, the active basic functional groups attached to the associated organic polymer are oriented with respect to the interfaces thereof so as to be partially or completely dissociable in the internal gel water into fixed positive ions linked to the polymer and into mobile exchangeable negative ions.

Typical such polymers to which active acidic functional groups may be attached include: phenol-aldehyde resins, polystyrene-divinylbenzene copolymers, and the like; and such suitable active acidic functional groups include: —$SO_3H$, —COOH, and the like; —$SO_3H$ being usually preferred because of its high dissociation constant. Typical such polymers to which active basic functional groups may be attached include: urea-formaldehyde resins, melamine-formaldehyde resins, polyalkylene-polyamine-formaldehyde resins, and the like; and such suitable active basic functional groups include: quaternary ammonium hydroxides, amino groups, the guanidyl group, the dicyanodiamidine group, and like organic nitrogen-containing basic groups, the quaternary ammonium hydroxide groups, the guanidine and dicyanodiamidine residue being usually preferred because of the high dissociation constants. Normally the water in gel relationship with the polymer should be present in an amount of at least 15% of the weight of the dry resin.

Also, the unit 10 is provided with a raw water inlet conduit or fixture 59 carried by the base 11 and connected to a suitable source of raw water to be demineralized, the raw water being under pressure and normally comprising a connection to the city water main. Preferably the inlet fixture 59 is formed of a molded insulating plastic material, such, for example, as a melamine resin and accommodates the connection thereto of an insulating conduit 60 communicating with the upper portion of the treatment chamber 27 and an insulating conduit 61 communicating with the anode chamber 28. The conduit 60 is preferably formed of the vinylidene chloride resin sold under the trade name "Saran," the lower end of the conduit 60 being secured in liquid-tight relation to the inlet fixture 59 by an associated thimble 62 also formed of Saran, and the upper end of the conduit 60 carrying a perforated diffuser 63 disposed in the top of the water treatment chamber 27 and also formed of Saran, the diffuser 63 being embedded in the upper portion of the ion exchange bed 58. The intermediate portion of the conduit 60 extends through an opening provided in the section 17 of the bottom header 13 and is sealed in liquid-tight relation therewith by an arrangement including two threaded collars 64 and 65, the collar 64 being suitably secured in liquid-tight relation to the section 17, and the collar 65 being secured in threaded engagement with the collar 64 and receiving a packing gland, not shown, closely embracing the conduit 60.

Further, the unit 10 is provided with a treated water outlet conduit or fixture 66 carried by the base 11 and connected to the home hot water heater, as explained more fully hereinafter. Preferably the outlet fixture 66 is formed of a molded insulating plastic material, such, for example, as a melamine resin and accommodates a connection thereto of an insulating conduit 67 communicating with the lower portion of the treatment chamber 27 and an insulating conduit 68 communicating with the cathode chamber 25. The conduit 67 is preferably formed of the vinylidene chloride resin sold under the trade name "Saran," the lower end of the conduit 67 being secured in liquid-tight relation to the outlet fixture 66 by an associated thimble 69 also formed of Saran, and the upper end of the conduit 67 carrying a perforated collector 70 disposed in the bottom of the water treatment chamber 27 and also formed of Saran, the collector 70 being embedded in the lower portion of the ion exchange bed 58. The intermediate portion of the conduit 60 extends through an opening provided in the section 17 of the bottom header 13 and is sealed in liquid-tight relation therewith by an arrangement including two threaded collars 71 and 72, the collar 71 being suitably secured in liquid-tight relation to the section 17, and the collar 72 being secured in threaded engagement with the collar 71 and receiving a packing gland, not shown, closely embracing the conduit 67.

The fitting 40 is molded of a plastic insulating material, such, for example, as a suitable melamine resin, and comprises, as best shown in Fig. 4, a hollow body 73 provided with a lower extension arranged in threaded engagement with the top of the opening 39a formed in the bushing 39, a lateral extension carrying a threaded bushing 74 and an upper extension carrying a threaded funnel 75. Preferably the bushing 74 and the funnel 75 are formed of Saran; and an elongated upstanding insulating tube 76, also formed of Saran, is arranged centrally within the anode chamber 28 and communicating between the funnel 75 and the bottom of the anode chamber 28. Specifically, the upper open end of the tube 76 is secured in place in liquid-tight relation in the top of the fitting 40 by the funnel 75 and in communication therewith, while the lower open end of the tube 76 terminates in the sediment trap 38 formed within the anode holder 29. Accordingly, the funnel 75 is in communication with the bottom of the anode chamber 28 through the tube 76, while the bushing 74 is in communication with the top of the anode chamber 28 through the opening 39a formed in the bushing 39 and through the hollow body 73 of the fitting 40.

Further, the unit 10 comprises a mixing device 77 disposed exteriorly of the cathode 12 and carried by the inwardly directed flange 23 provided on the top of the base 11; which mixing device 77 is preferably formed of mild steel and comprises an upstanding tubular shell 78 having an open top and containing a partition 79 dividing the interior thereof into two compartments 80 and 81, the compartment 81 communicating with a drain conduit 82 extending to drain plumbing, not shown. Thus, it will be understood that the solutions delivered into the compartment 80 through the open top of the mixing device 77 are thoroughly mixed therein and pass over the top of the partition 79 into the compartment 81 from whence the mixture flows by gravity into the drain conduit 82 and thence into the drain plumbing, not shown.

Preferably the conduit 61 is also formed of Saran and the lower end thereof is connected to the inlet fixture 59 by an insulating thimble 83 formed of Saran, while the upper end thereof terminates in a nozzle 84 disposed above and in spaced relation to the open top of the funnel 75, as shown in Fig. 3. Arranged in the conduit 61 in tandem relation are a solenoid operated valve 85 and a flow control device 86, the valve 85 being normally biased into its closed position and the flow control device 86 regulating the flow of raw water through the conduit 61 when the valve 85 occupies its open position. The raw water flowing through the conduit 61 is directed by the nozzle 84 downwardly through the adjacent air gap and into the funnel 75 from which it is delivered via the tube 76 into the bottom of the anode chamber 28, as previously mentioned. Preferably the conduit 68 is also formed of Saran and the lower end thereof is connected to the outlet fixture 66 by an insulating thimble 87 formed of Saran, while the upper end thereof terminates in a nozzle 88 disposed above and in spaced relation to the open top of an upstanding insulating conduit 89 formed of Saran that communicates with the lower portion of the cathode chamber 25. More particularly, a fixture 90 is secured to the lower portion of the cathode 12 in liquid-tight relation thereto and communicates through an opening provided therein with the lower portion of the cathode chamber 25; the lower end of the upstanding conduit 89 is secured in liquid-tight relation to an insulating bushing 91 formed of Saran that, in turn, is secured in liquid-tight relation to the fixture 90. Arranged in the conduit 68 in tandem relation are a solenoid operated valve 92 and a flow control device 93, the valve 92 being normally biased into its closed position and the flow control device 93 regulating the flow of treated water through the conduit 68 when the valve 92 occupies its open position. The treated water flowing through the conduit 68 is directed by the nozzle 88 downwardly through the adjacent air gap and into the conduit 89 from which it is delivered via the fixture 90 into the bottom of the cathode chamber 25, as previously mentioned.

The anolyte from the upper portion of the anode chamber 28 is discharged into the compartment 80 of the mixing device 77 via an insulating conduit 94 formed of Saran, and the catholyte from the upper portion of the cathode chamber 25 is discharged into the compartment 80 of the mixing device 77 via an insulating conduit 95 formed of Saran. More particularly, the upper end of the conduit 94 is connected in liquid-tight relation to the bushing 74 that is carried by the fitting 40 while the lower open end thereof projects into submerged relation with the solution contained in the compartment 80 of the device 77. The upper end of the conduit 95 is connected in liquid-tight relation to an insulating bushing 96 formed of Saran that, in turn, is secured in liquid-tight relation to a fitting 97 that is carried by the cathode 12 in liquid-tight relation therewith and communicating with the upper portion of the cathode chamber 25; while the lower open end of the conduit 95 terminates above the open top of the mixing device 77 and in alignment with the compartment 80 formed therein. Accordingly, it will be understood that when raw water is introduced via the conduit 61, the nozzle 84, the funnel 75, the fitting 40 and the tube 76 into the lower portion of the anode chamber 28, that anolyte is forced from the upper portion of the anode chamber 28 through the opening 39a formed in the bushing 39, the hollow body 73 of the fitting 40, the bushing 74 and the conduit 94 and into the compartment 80 of the mixing device 77. Similarly, when treated water is introduced via the conduit 68, the nozzle 88, the conduit 89 and the fitting 90 into the lower portion of the cathode chamber 25, catholyte is forced from the upper portion of the cathode chamber 25 through the fitting 97, the bushing 96 and the conduit 95 and spills into the compartment 80 of the mixing device 77. Hence, the anolyte and the catholyte are mixed in the compartment 80 formed in the mixing device 77 and the mixture then passes to the exterior via the drain conduit 82, as previously explained.

The fitting 97 removably receives an insulating cartridge 98 formed of Saran and arranged in communication therewith and disposed just below the upper flange 22 carried by the cathode 12; which cartridge 98 contains a suitable charge of catalytic material 99, that is employed for the purpose of inducing a controlled water-producing reaction involving the hydrogen gas that is contained in the catholyte discharged from the cathode chamber 25. The catalyst 99 may essentially comprise platinum beads that are commonly employed for the purpose mentioned, and air is admitted into the cartridge 98 to supply the required oxygen via a filter plug 100 arranged in an opening formed in the top of the cartridge 98.

For the purpose of circulating the water in the treatment compartment 27, a pump arrangement is provided, as illustrated in Fig. 4, that includes a water pump 101 provided with respective intake and discharge connections 102 and 103, a perforated collector 104 arranged in the bottom of the treatment chamber 27 and embedded in the lower portion of the ion exchange bed 58, and a perforated diffuser 105 arranged in the top of the treatment chamber 27 and embedded in the upper portion of the ion exchange bed 58. The collector 104 is formed of Saran and is connected by a conduit 106 to the inlet connection 102 of the pump 101, and the diffuser 105 is formed of Saran and is connected by a conduit 107 to the outlet connection 103 of the pump 101. The conduit 106 is formed of Saran and the intermediate portion thereof projects through an opening formed in the section 17 of the bottom header 13 and is sealed in liquid-tight relation to the bottom header 13 by an arrangement including two collars 108 and 109, the collar 108 being secured in liquid-tight relation to the section 17 and the collar 109 being secured in threaded relation to the collar 108 with a packing gland, not shown, therebetween and arranged in close fitting relation with respect to the conduit 106. The conduit 107 is formed of Saran and the intermediate portion thereof projects through an opening formed in the section 17 of the bottom header 13 and is sealed in liquid-tight relation to the bottom header 13 by an arrangement including two collars 110 and 111, the collar 110 being secured in liquid-tight relation to the section 17 and the collar 111 being secured in threaded relation to the collar 110 with a packing gland, not shown, therebetween and arranged in close fitting relation with respect to the conduit 107. Specifically, the top end of the conduit 106 carries the collector 104 and the bottom end thereof is secured to the inlet connection 102 by an insulating thimble 112 formed of Saran; and similarly, the top end of the conduit 107 carries the diffuser 105 and the bottom end thereof is secured to the outlet connection 103 by an insulating thimble 113 formed of Saran. Accordingly, it will be understood that when the pump 101 is operated, the solution in the treatment chamber 27 is drawn into the collector 104 from the lower portion of the ion exchange bed 58 and is discharged from the diffuser 105 into the upper portion of the ion exchange bed 58, the solution passing through the porous ion exchange bed 58 in the circulation, as well as through the pump 101 and the connecting conduits 106 and 107.

Considering now the automatic control system for the water demineralizing unit 10, and referring to Fig. 1, it is noted that the component elements of the unit 10 are shown schematically with the anode chamber 28 on the right, with the cathode chamber 25 on the left and with the water treatment chamber 27 in the center, the anode being indicated at 31 and the cathode being indicated at 12, for the present purpose.

In the arrangement, the cathode 12 is grounded or connected to ground potential by a ground bus 123 and the anode 31 is connected to the power supply cable 57 as previously explained; the pump 101 is provided with an electric drive motor 120; and the solenoid controlled valves 85 and 92 are respectively provided with operating solenoids 85a and 92a. Further, the control system comprises a source of 118 volts single-phase power terminated by a line switch 121 and a rectifier unit 122 provided with a pair of input terminals connected to the switch 121, as well as a pair of output terminals, the negative output terminal being connected to the ground bus 123 and thus to ground potential, and the positive output terminal being connected to a supply bus 124. The raw water inlet fixture 59 is connected to a raw water supply pipe 125, that is connected, in turn, to the city water main, not shown, so that raw water under pressure is supplied to the pipe 125. The treated water outlet fixture 66 of the unit 10 is connected to a pipe 126 that extends to the inlet of the home hot water heater, indicated at 127, the outlet of the water heater 127 being connected to the hot water supply pipe 128 that is controlled by a valve, indicated as the manually operable valve 129.

A demand responsive device is operatively associated with the pipe 126 and may take the form of a pressure controlled bellows 130 communicating with the pipe 126 and governing a contact bridging member 130a provided with front and back contacts, as illustrated. When the valve 129 is closed, the pressure in the pipe 126 controls the bellows 130 so that the contact bridging member 130a closes its front contacts and opens its back contacts; on the other hand, when the valve 129 is opened, the pressure in the pipe 126 is reduced controlling the bellows 130 so that the contact bridging member 130a opens its front contacts and closes its back contacts. The pressure responsive type of demand device is entirely conventional and any other suitable demand controlled switch may be substituted therefor.

Finally, the control system comprises a control switch 131 of the thermal type and including two contact carrying elements 132 and 133, the element 133 being of the bimetallic type arranged in heat exchange relation with an associated heater 134, and the element 132 being manually adjustable by an associated control knob 135 through an associated biasing spring 136.

In the arrangement: the supply cable 57 that is connected to the anode 31 is also connected to one of the front contacts governed by the contact bridging member 130a and to one terminal of the motor 120; the other front contact governed by the contact bridging member 130a is connected to the supply bus 124; one of the back contacts governed by the contact bridging member 130a is connected to a conductor 137, and the other of the back contacts governed by the contact bridging member 130a is also connected to the supply bus 124. The other terminal of the motor 120 is connected to a conductor 138 that is terminated by the switch element 132; the conductor 137 is connected to one terminal of the solenoid 92a and to one terminal of the heater 134; the other terminal of the heater 134 is connected to a conductor 139 that, in turn, is connected to the switch element 133 and to the ground bus 123. The other terminal of the solenoid 92a is connected to a conductor 140 that is also connected to one terminal of the solenoid 85a; while the other terminal of the solenoid 85a is connected to the ground bus 123.

Considering now the general mode of operation of the automatic control system for the unit 10, when the power switch 121 occupies its closed position the rectifier unit 122 is rendered operative, whereby a direct voltage of about 60–80 volts D.C. appears upon the supply bus 124 with respect to the ground bus 123 and ground potential and is connected via the contact bridging member 130a and its front contacts to the cable 57, when there is no demand upon the unit 10. As previously explained, the cable 57 is connected to the anode 31, whereby the line voltage is impressed between the anode 31 and the cathode 12 causing a current to flow therebetween and thence back to the ground bus 123. The current mentioned passes through the anolyte in the anode chamber 28, the barrier 26, the water undergoing treatment in the treatment chamber 27, as well as the ion exchange bed 58 arranged in the treatment chamber 27, the barrier 24 and the catholyte in the cathode chamber 25; whereby the ion exchange bed 58 is regenerated, as explained more fully hereinafter.

A demand is made upon the unit 10 when the manual valve 129 is operated into its open position so that the hot water in the pipe 128 is discharged to the exterior, whereby hot water flows from the water heater 127 into the pipe 128 and cold water flows into the water heater 127 from the pipe 126, the water being supplied to the pipe 126 from the treatment chamber 27 of the unit 10 via the outlet fixture 66. Raw water from the cold water supply pipe 125 is supplied into the treatment chamber 27 of the unit 10 via the inlet fixture 59; whereby the raw water is demineralized by the ion exchange bed 58 provided in the treatment chamber 27, as explained more fully hereinafter, and passes therethrough and thence via the outlet conduit 66 into the pipe 126. While pressure is maintained throughout the system during the demand for hot water, there is a reduction in pressure in the pipe 126 and the bellows 130 responds thereto to effect operation of the contact bridging member 130a from its front position into its back position, as previously noted. Specifically, the contact bridging member 130a interrupts at its front contacts the previously traced circuit for supplying current to the anode 31 and completes at its back contacts an obvious circuit for energizing the heater 134 of the switch 131, as well as a multiple circuit for energizing in series relation the solenoids 92a and 85a. Accordingly, the valves 85 and 92 are operated into their open positions so that raw water from the inlet fixture 59 proceeds through the conduit 61 and via the tube 76 into the bottom of the anode chamber 28, and treated water proceeds through the conduit 68 and via the conduit 89 into the bottom of the cathode chamber 25. The raw water supplied via the tube 76 into the bottom of the anode chamber 28 rises therein forcing some of the anolyte via the conduit 94 into the mixing device 77, and the treated water supplied via the conduit 89 into the bottom of the cathode chamber 25 rises therein forcing some of the catholyte via the conduit 95 into the mixing device 77. Of course, the anolyte and the catholyte are mixed in the mixing device 77 and discharged via the drain conduit 82 to the drain plumbing, not shown. In the arrangement: the flow control device 86 may be so adjusted that about 10% of the raw water supplied to the inlet fixture 59 passes through the conduit 61 into the anode chamber 28 for the anode wash purpose, as explained above; and the flow control device 93 may be so adjusted that about 10% of the treated water supplied to the outlet fixture 66 passes through the conduit 68 into the cathode chamber 25 for the cathode wash purpose, as explained above.

When the heater 134 is energized, as mentioned above, the bimetallic switch element 133 is quickly heated and deflected toward the cooperating switch element 132 closing the carried contacts so as to prepare a circuit traced hereinafter, for operating the motor 120; which circuit is not completed at this time. As long as there is a demand upon the unit 10, the contact bridging member 130a remains in its rear position maintaining energized the solenoids 85a and 92a and maintaining the energization of the heater 134 of the switch 131; however, when the demand subsides, by closing of the manual valve 129, the pressure in the pipe 126 is restored back to that of the source of raw water supplied by the supply pipe 125; whereby the bellows 130 responds thereto operating the contact bridging member 130a from its back position into its front position. When the contact bridging member 130a is operated out of its back position, it interrupts at its back contacts the circuit for energizing the solenoids 85a and 92a in series relation, as well as the parallel circuit for energizing the heater 134 of the switch 131. Accordingly, the valves 85 and 92 are returned back into their closed positions so as to shut-off the supply of raw water to the anode chamber 28 and of treated water to the cathode chamber 25. In passing, it is mentioned that the pressure of the anolyte in the anode chamber 28 is established by the hydrostatic head of water in the tube 76, whereby the top of the funnel 75 carried upon the top end of the tube 76 is disposed above the conduit 94 extending to the mixing device 77; and similarly, the pressure of the catholyte in the cathode chamber 25 is established by the hydrostatic head of the water in the conduit 89, whereby the top of the conduit 89 is disposed above the fitting 97 and consequently the conduit 95 extending to the mixing device 77.

When the contact bridging member 130a is returned into its front position, the supply bus 124 is reconnected to the cable 57 so that current is again supplied to the anode 31; and moreover, a circuit is completed for operating the motor 120; which circuit includes the switch 131 in its closed position. The operatnig motor 120 effects operation of the pump 101, whereby the water in the treatment chamber 27 is circulated through the ion exchange bed 58 arranged therein so as to insure complete demineralization and a uniform character of the water therein, for a purpose more fully described hereinafter. The time interval of operation of the motor 120, and consequently the circulation of the water in the treatment chamber 27 by the pump 101, is established by the switch 131 that constitutes a timer; and more specifically, after a given time interval, the cooling of the bimetallic switch element 133 is sufficient to cause it to disengage the cooperating switch element 132 so as to interrupt the above-traced circuit for operating the motor 120 with the result that further circulation of the water in the treatment chamber 27 is arrested at this time. The time interval during which the switch 131 occupies its closed position, following the deenergization of the heater 134, is dependent upon the adjustment of the normal position of the switch element 132 that is accomplished by adjustment of the manual control knob 135, whereby the time interval mentioned may be manually adjusted and is normally of the order of about 10 minutes.

In view of the foregoing considerations, it will be understood that each time a demand is made upon the unit 10, water to be demineralized is supplied to the treatment chamber 27, raw water is supplied into the anode chamber 28 and treated water is supplied into the cathode chamber 25; the supplies mentioned being maintained during the demand time interval. Also incident to each substantial demand upon the unit 10, the switch 131 is set into its closed position so that following the demand, the motor 120 is operated for a preset time interval so as to effect circulation of the water by the pump 101 in the treatment chamber 27 during the time interval mentioned. In this connection, it is pointed out that should the valve 128 be opened and then reclosed after a very short time interval such that the demand upon the unit 10 is inconsequential, the heating of the heater 134 is likewise inconsequential, so that the switch 131 is not set into its closed position with the result that the motor 120 is not operated following the inconsequential demand. This arrangement is very advantageous because it renders the time interval of the operation of the switch 131 into its closed position, following the conclusion of the demand, proportional to the time duration of the demand by virtue of the circumstance that the heating of the heater 134 is dependent upon the time duration of the demand so that the set of the switch 130 into its closed position is also proportional to this time interval of the demand. In other words, it is inherent in the operation of the switch 131 that it is not only governed by the manual adjustment of the control knob 131, but also by the time duration of heating of the heater 134, the adjustment of the manual control knob 135 being, of course, the dominant factor.

Also in the operation of the unit 10, small amounts of hydrogen ion are reduced at the cathode 12 producing hydrogen gas that proceeds with the catholyte from the cathode chamber 25 into the fitting 97 and thus into the cartridge 98 to be reacted with oxygen in the presence of the catalyst 99 so as to produce water that may be disposed of along with the catholyte into the mixing device 77; which arrangement prevents any possibility of a hydrogen explosion, thereby eliminating this hazard. Also small amounts of hydroxy ion are oxidized at the anode 31 producing oxygen that proceeds with the anolyte from the anode chamber 28 into the mixing device 77.

Considering now a constructional example of the unit 10 (especially designed for incorporation in a hot water supply system for home use), it is noted: the internal diameter of the barrier 26 may be about 8½"; the internal diameter of the barrier 24 may be about 17"; the internal diameter of the cathode 12 may be about 20"; the height of the treatment chamber 27 between the layers 49 and 52 may be about 24½"; and the thickness of the treatment chamber 27 between the barriers 25 and 26 may be about 4". Accordingly, the ion exchange bed 58 may comprise a heterogeneous mixture of about 1 cubic foot of the cation exchange resin "Amberlite IR–120" and about 1 cubic foot of the anion exchange resin "Amberlite IRA–410."

In this constructional example of the unit 10, the ion exchange bed 58 has a capacity for demineralizing raw water, at an ambient temperature of about 40° F., so as to reduce the total dissolved solids count thereof from about 800 p.p.m. to 35 p.p.m. as follows:

5.5 gallons per minute on demand
45 gallons average daily output
65 gallons peak daily output (intermittently)

Moreover the water pressure in the treatment chamber 27 should not exceed about 45 p.s.i.; and the power consumption at 60 to 80 volts D.C. should fall in the general range 2–4 watts; whereby the operating cost of the unit 10 should be very nominal. Of course, the supply of the power noted to the unit 10 effects satisfactory regeneration of the ion exchange bed 58 in 24 hours to meet the average daily output of 45 gallons, and the latent ion exchange capacity of the ion exchange bed 58 is ample to meet the required peak daily output, upon an intermittent basis, of 65 gallons.

The foregoing discussion of the operating characteristics of the demineralizing unit 10 are based upon laboratory tests, wherein exceedingly hard test water having a total dissolved solids count of 800 p.p.m. was employed; which test water was produced by dissolving additional $CaCl_2$ in Chicago city water having an initial total dissolved solids count of 157 p.p.m. and a hardness calculated in terms of $CaCO_3$ of 125 p.p.m. Accordingly, these test conditions were exceedingly rigorous since hard water normally encountered in hard-water areas does not ordinarily contain a total dissolved solids count nearly so high as 800 p.p.m., or a hardness equivalency calculated in terms of $CaCO_3$ that in any way approximates that of this hard test water. Thus, the demineralizing unit 10 when operated to demineralize Chicago city water would have a demineralizing capacity in excess of 250 gallons per 24-hour period. Hence, the test conditions were exceedingly rigorous when it is considered that Los Angeles city water is considered to be very hard, since it contains a total dissolved solids count of 421 p.p.m. and a hardness equivalency calculated in terms of $CaCO_3$ of 274.

In the demineralization of hard water, the unit 10 removes such cations as: $Ca^{++}$, $Mg^{++}$, $Fe^{++}$, $Na^+$, $K^+$, etc., and such anions as: $HCO_3^-$, $SO_4^{--}$, $Cl^-$, $NO_3^-$, etc.; and, as previously explained, the various cations and anions of the electrolytes dissolved in the hard water are first removed by the ion exchange bed 58 in order to reduce the total dissolved solids content of the water undergoing treatment from about 800 p.p.m. to a value in the range 35–40 p.p.m. Subsequently, and as time proceeds, these cations and anions of the electrolytes mentioned are removed from the ion exchange bed 58, as the ion exchange bed 58 is regenerated, as previously explained, by the electrodialysis. In this regeneration of the ion exchange bed 58, it is postulated that the resins constitute solid poly-electrolytes for the transportation of the ions involved from the treatment chamber 27; and specifically, it is visualized that the cations are involved in a great multiplicity of exchanges with a considerable number of the individual cation exchange particles in their movements toward the cathode 12, and that the anions are involved in a great multiplicity of exchanges with a considerable number of the individual anion exchange particles in their movements toward the anode 31; the mechanism involved being visualized as like the mode involved in playing the child's game of "musical chairs." In this mechanism, it is suggested that the energy required to effect the successive ion exchanges of a great number of the ions in the mixed resin bed 58, and the consequent transportation of a given number of the ions out of the treatment chamber 27, is very small compared to the energy required to effect the direct migration of the same given number of ions from the treatment chamber 27, in the absence of the mixed resin bed 58, due fundamentally to the fact that in the direct migration of the ions, there must be a great amount of energy lost through random collision by the ions with water molecules and the ions must expend a great amount of work upon the dipolar water molecules in passing therethrough.

In any case, and without reference to the exact mechanism involved, the energy requirements of the unit 10, incorporating the mixed resin bed 58, to bring about a predetermined electrodialysis of a given volume of raw water of given hardness is greatly reduced with respect to conventional electrolytic apparatus, and this fact is immediately apparent by the tremendous reduction in the amount of heat developed in the unit 10. In other words, the temperature of the treated water in the treatment chamber 27, after being subjected to the electrodialysis, is not substantially elevated above the ambient temperature; which characteristic is entirely different with respect to that of conventional electrolytic apparatus.

Of course, it follows that when the total dissolved solids count of the treated water delivered by the unit 10 to the hot water heater 127 has a value in the range 35–40 p.p.m., there is no formation of objectionable scale in the storage tank of the hot water heater 127 and the water from the hot water supply conduit 128 is entirely suitable for all types of washing operations, without the noticeable formation of any insoluble calcium or magnesium salts of higher fatty acids (oleates, palmates, etc.) derived from soap products employed in such washing operations. Moreover, the total evaporation of this treated water carried by glassware, or the like, in automatic dishwashing apparatus leaves no noticeable salt residue to spot or stain the glassware. Thus the demineralized water supplied from the hot water supply conduit 128 is entirely suitable for all household washing, cooking, etc. purposes and is not subject to the criticisms of such water that has been merely softened in conventional zeolite equipment.

Again referring to the operation of the unit 10, it is explained that incident to a demand for treated water therefrom by the hot water heater 127, raw water is introduced into the upper portion of the treatment chamber 27 via the diffuser 63 as the treated water is withdrawn from the lower portion of the treatment chamber 27 via the collector 70; whereby the raw water percolates through the bed 58 downwardly from the diffuser 63 toward the collector 70 during the demand. Thus during the demand, the ion exchange bed 58 is progressively depleted with respect to its ion exchange capacity from the top toward the bottom thereof; and likewise the concentration of the total dissolved solids in the water in the treatment chamber 27 varies considerably at the conclusion of the demand, the total dissolved solids count being considerably higher toward the top of the treatment chamber 27. This circumstance causes the electrolyte in the treatment chamber 27 to be of variable conductance at the conclusion of a demand; which condition has been found to be highly objectionable from the standpoint of the subsequent regeneration of the ion exchange bed 58. Accordingly, at the conclusion of the demand, the circulation pump 101 is operated for the time interval mentioned so as to circulate the water in the treatment chamber 27 from the diffuser 105 through the ion exchange bed 58 and into the collector 104; whereby in a short time interval the total dissolved solids count of the water contained in the treatment chamber 27 is brought to a substantially uniform concentration throughout all parts thereof and to a concentration well within the range 35–40 p.p.m. Thus the electrolyte in the treatment chamber 27 has a substantially uniform conductance during the following and relatively long regeneration period of the ion exchange bed 58 after the termination of the demand; which condition has been found to be substantially ideal for the purpose of effecting regeneration of the ion exchange bed 58 with a minimum consumption of power. It is postulated that the reduction of the energy required to regenerate the ion exchange bed 58, when the electrolyte has a very low total dissolved solids count is brought about by the more efficient utilization of the electric current through the cation exchange material and the anion exchange material when the resistance of the electrolyte is high. Specifically, it is visualized that in effect there are three parallel current paths between the anode and the cathode, the first through the cation exchange material, the second through the anion exchange material and the third through the electrolyte. Thus when the total dissolved solids count in the electrolyte is low, the resistance thereof is high so as to reduce the current in the third path mentioned and the consequent leakage of current between the anode and the cathode therethrough, whereby a disproportional amount of the current passes between the anode and the cathode via the first and second paths mentioned, so that there is a reduction in the heating of the electrolyte and an improved efficiency of cation and anion transfers between the anode and the cathode. In any case, and without reference to the particular mechanism involved, it has been clearly established that the power requirements of the unit 10 in order to maintain the ion exchange bed 58 in proper regenerated condition are clearly reduced and minimized by the simple expedient of recirculating the water in the treatment compartment 27 for a short time interval following each demand for treated water from the unit 10. Specifically, the arrangement not only contributes to overall efficiency, but greatly minimizes undesirable heating of the treated water in the unit 10.

A modification in the automatic control circuit for the unit 10, with respect to that shown in Fig. 1, is contemplated, wherein the supply of power to the anode 31 is continuous and the operation of the electric motor 120 is continuous. In this case, the conduction of current between the anode 31 and the cathode 12 is continuous and the continuous operation of the motor 120 effects corresponding continuous operation of the pump 101 so that the circulation of the water in the treatment chamber 27 is continuous.

In view of the foregoing, it is apparent that there has been provided a water demineralizing unit of improved construction and arrangement, as well as an improved water supply system incorporating the water demineralizing unit, the arrangement being especially designed for home use and being entirely automatic so that it requires no recharging or special care on the part of the user.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A water demineralizing system comprising: a demineralizing unit including structure defining first and second and third chambers and provided with a first diaphragm as a common wall between said first and second chambers and a second diaphragm as a common wall between said first and third chambers, a porous ion exchange bed arranged in said first chamber in interposed relation with respect to said first and second diaphragms and characterized by both cation and anion exchange, an anode in said second chamber, and a cathode in said third chamber; an inlet pipe for containing a supply of raw water under pressure and connected to said first chamber; an outlet pipe for containing demineralized water under pressure and connected to said first chamber; valve mechanism for controlling the flow of demineralized water from said outlet pipe to the exterior and the flow of raw water from said inlet pipe into said first chamber and into contact with said first and second diaphragms and said bed; means for opening and for closing said valve mechanism; said bed being so constructed and arranged that the cations and the anions of the salts dissolved in the raw water are quickly exchanged by said bed respectively for hydrogen ions and hydroxyl ions carried thereby in order quickly to demineralize the raw water with the result that the ion exchange capacity of said bed is correspondingly reduced; a drain pipe; a first conduit for conducting a first stream of water as an anolyte through said second chamber into contact with said first diaphragm and said anode and thence into said drain pipe; a second conduit for conducting a second stream of water as a catholyte through said third chamber into contact with said second diaphragm and said cathode and thence into said drain pipe; valve equipment for controlling the flow of said first and second streams of water; means responsive to opening and closing of said valve mechanism for respectively opening and closing said valve equipment; and means for conducting a direct current from said anode to said cathode through said first and second diaphragms and through the water in said first and second and third chambers and through said bed, whereby said bed is subjected to ion regeneration in that the cations and the anions of the salts mentioned carried by said bed are gradually re-exchanged for hydrogen ions and hydroxyl ions from the water in said first chamber and subjected to electrodialysis so that they are transported respectively into said catholyte and said anolyte and respectively carried by said second and first streams of water into said drain pipe with the result that the ion exchange capacity of said bed is gradually increased following closing of said valve mechanism.

2. A water demineralizing system comprising: a demineralizing unit including structure defining first and second and third chambers and provided with a first diaphragm as a common wall between said first and second chambers, and a second diaphragm as a common wall between said first and third chambers, a porous ion exchange bed arranged in said first chamber in interposed relation with respect to said first and second diaphragms and characterized by both cation and anion exchange, an anode in said second chamber, and a cathode in said third chamber; an inlet pipe for containing a supply of raw water under pressure and connected to said first chamber; an outlet pipe for containing demineralized water under pressure and connected to said first chamber; valve mechanism for controlling the flow of demineralized water from said outlet pipe to the exterior and the flow of raw water from said inlet pipe into said first chamber and into contact with said first and second diaphragms and said bed; means for opening and for closing said valve mechanism; said bed being so constructed and arranged that the cations and the anions of the salts dissolved in the raw water are quickly exchanged by said bed respectively for hydrogen ions and hydroxyl ions carried thereby in order quickly to demineralize the raw water with the result that the ion exchange capacity of said bed is correspondingly reduced; a drain pipe; a first conduit for conducting a first stream of raw water as an anolyte from said inlet pipe through said second chamber into contact with said first diaphragm and said anode and thence into said drain pipe; a second conduit for conducting a second stream of demineralized water as a catholyte from said first chamber through said third chamber into contact with said second diaphragm and said cathode and thence into said drain pipe; valve equipment for controlling the flow of said first and second streams of water; means responsive to opening and closing of said valve mechanism for respectively opening and closing said valve equipment; and means for conducting a direct current from said anode to said cathode through said first and second diaphragms and through the water in said first and second and third chambers and through said bed, whereby said bed is subjected to ion regeneration in that the cations and the anions of the salts mentioned carried by said bed are gradually re-exchanged for hydrogen ions and hydroxyl ions from the water in said first chamber and subjected to electrodialysis so that they are transported respectively into said catholyte and said anolyte and respectively carried by said second and first streams of water into said drain pipe with the result that the ion exchange capacity of said bed is gradually increased following closing of said valve mechanism.

3. A water demineralizing system comprising: a demineralizing unit including structure defining first and second and third chambers and provided with a first diaphragm as a common wall between said first aand second chambers and a second diaphragm as a common wall between said first and third chambers, a porous ion exchange bed arranged in said first chamber in interposed relation with respect to said first and second diaphragm and characterized by both cation and anion exchange, an anode in said second chamber, and a cathode in said third chamber; an inlet pipe for containing a supply of raw water under pressure and connected to said first chamber; an outlet pipe for containing demineralized water under pressure and connected to said first chamber; valve mechanism for controlling the flow of demineralized water from said outlet pipe to the exterior and the flow of raw water from said inlet pipe into said first chamber and into contact with said first and second diaphragms and said bed; means for opening and for closing said valve mechanism; said bed being so constructed and arranged that the cations and the anions of the salts dissolved in the raw water are quickly exchanged by said bed respectively for hydrogen ions and hydroxyl ions carried thereby in order quickly to demineralize the raw water with the result that the ion exchange capacity of said bed is correspondingly reduced; a first conduit for conducting water into said second chamber; a second conduit for conducting water into said third chamber; a third conduit for conducting water from said second chamber; a fourth conduit for conducting water from said third chamber; valve equipment for controlling the flow of a first stream of water from said first conduit through said second chamber as an anolyte into contact with said first diaphragm and said anode and thence into said third conduit and the flow of a second stream of water from said second conduit through said third chamber as a catholyte into contact with said second diaphragm and said cathode and thence into said fourth conduit; structure defining a mixing chamber disposed exteriorly of said unit and commonly communicating with said third and fourth conduits; a drain pipe communicating with said mixing chamber; and means for conducting a direct current from said anode to said cathode through said first and second diaphragms and through the water in said first and second and third chambers and through said bed, whereby said bed is subjected to ion regeneration in that the cations and the anions of the salts mentioned carried by said bed are gradually re-exchanged for hydrogen ions from the water in said first chamber and subjected to electrodialysis so that they are transported respectively into said catholyte and said anolyte and respectively carried by said second and first streams of water into said mixing chamber and thence into said drain pipe with the result that the ion exchange capacity of said bed is gradually increased following closing of said valve mechanism.

4. The water demineralizing system set forth in claim 3, wherein each of said four conduits named is formed of insulating material so as to minimize the conduction of stray direct electric currents therethrough from said anode to said cathode.

5. The water demineralizing system set forth in claim 3, and further comprising a first device arranged in said first conduit for preventing back-siphoning of said anolyte from said second chamber; and a second device arranged in said second conduit for preventing back-siphoning of said catholyte from said third chamber.

6. The water demineralizing system set forth in claim 5, wherein said first device consists essentially of a first gap arranged between two sections of said first conduit, and said second device consists essentially of a second gap arranged between two sections of said second conduit.

7. A water demineralizing system comprising: a demineralizing unit including structure defining first and second and third chambers and provided with a first diaphragm as a common wall between said first and second chambers and a second diaphragm as a common wall between said first and third chambers, a porous ion exchange bed arranged in said first chamber in interposed relation with respect to said first and second diaphragms and characterized by both cation and anion exchange, an anode in said second chamber, and a cathode in said third chamber; an inlet pipe for containing a supply of raw water under pressure and connected to said first chamber; an outlet pipe for containing demineralized water under pressure and connected to said first chamber; valve mechanism for controlling the flow of demineralized water from said outlet pipe to the exterior and the flow of raw water from said inlet pipe into said first chamber and into contact with said first and second diaphragms and said bed; means for opening and for closing said valve mechanism; said bed being so constructed and arranged that the cations and the anions of the salts dissolved in the raw water are quickly exchanged by said bed respectively for hydrogen ions and hydroxyl ions carried thereby in order quickly to demineralize the raw water with the result that the ion exchange capacity of said bed is correspondingly reduced; a drain pipe; a first conduit for conducting a first stream of water as an anolyte through said second chamber into contact with said first diaphragm and said anode and thence into said drain pipe; a second conduit for conducting a second stream of water as a catholyte through said third chamber into contact with said second diaphragm and said cathode and thence into said drain pipe; means for conducting a direct current from said anode to said cathode through said first and second diaphragms and through the water in said first and second and third chambers and through said bed, whereby said bed is subjected to ion regeneration in that the cations and the anions of the salts mentioned carried by said bed are gradually re-exchanged for hydrogen ions and hydroxyl ions from the water in said first chamber and subjected to electrodialysis so that they are transported respectively into said catholyte and said anolyte and respectively carried by said second and first streams of water into said drain pipe with the result that the ion exchange capacity of said bed is gradually increased following closing of said valve mechanism; and means for effecting local recirculation of the water in said first chamber through said bed during regeneration thereof.

8. A water demineralizing system comprising: a demineralizing unit including structure defining first and second and third chambers and provided with a first diaphragm as a common wall between said first and second chambers and a second diaphragm as a common wall between said first and third chambers, a porous ion exchange bed arranged in said first chamber in interposed relation with respect to said first and second diaphragms and characterized by both cation and anion exchange, an anode in said second chamber, and a cathode in said third chamber; an inlet pipe for containing a supply of raw water under pressure and connected to said first chamber; an outlet pipe for containing demineralized water under pressure and connected to said first chamber; valve mechanism for controlling the flow of demineralized water from said outlet pipe to the exterior and the flow of raw water from said inlet pipe into said first chamber and into contact with said first and second diaphragms and said bed; means for opening and for closing said valve mechanism; said bed being so constructed and arranged that the cations and the anions of the salts dissolved in the raw water are quickly exchanged by said bed respectively for hydrogen ions and hydroxyl ions carried thereby in order quickly to demineralize the raw water with the result that the ion exchange capacity of said bed is correspondingly reduced; a drain pipe; a first conduit for conducting a first stream of water as an anolyte through said second chamber into contact with said first diaphragm and said anode and thence into said drain pipe; a second conduit for conducting a second stream of water as a catholyte through said third chamber into contact with said second diaphragm and said cathode and thence into said drain pipe; means for conducting a direct current from said anode to said cathode through said first and second diaphragms and through the water in said first and second and third chambers and through said bed, whereby said bed is subjected to ion regeneration in that the cations and the anions of the salts mentioned carried by said bed are gradually re-exchanged for hydrogen ions and hydroxyl ions from the water in said first chamber and subjected to electrodialysis so that they are transported respectively into said catholyte and said anolyte and respectively carried by said second and first streams of water into said drain pipe with the result that the ion exchange capacity of said bed is gradually increased following closing of said valve mechanism; a device operative to effect local recirculation of the water in said first chamber through said bed; and timing means for operating said device for a time interval after each closing of said valve mechanism following each opening thereof.

9. A water demineralizing system comprising: a demineralizing unit including structure defining first and second and third chambers and provided with a first diaphragm as a common wall between said first and second chambers and a second diaphragm as a common wall between said first and third chambers, a porous ion exchange bed arranged in said first chamber in interposed relation with respect to said first and second diaphragms and characterized by both cation and anion exchange, an anode in said second chamber, and a cathode in said third chamber; an inlet pipe for containing a supply of raw water under pressure and connected to said first chamber; an outlet pipe for containing demineralized water under pressure and connected to said first chamber; valve mechanism for controlling the flow of demineralized water from said outlet pipe to the exterior and the flow of raw water from said inlet pipe into said first chamber and into contact with said first and second diaphragms and said bed; means for opening and for closing said valve mechanism; said bed being so constructed and arranged that the cations and the anions of the salts dissolved in the raw water are quickly exchanged by said bed respectively for hydrogen ions and hydroxyl ions carried thereby in order quickly to demineralize the raw water with the result that the ion exchange capacity of said bed is correspondingly reduced; a drain pipe; a first conduit for conducting a first stream of water as an anolyte through said second chamber into contact with said first diaphragm and said anode and thence into said drain pipe; a second conduit for conducting a second stream of water as a catholyte through said third chamber into contact with said second diaphragm and said cathode and thence into said drain pipe; means for conducting a direct current from said anode to said cathode through said first and second diaphragms and through the water in said first and second and third chambers and through said bed, whereby said bed is subjected to ion regeneration in that the cations and the anions of the salts mentioned carried by said bed are gradually re-exchanged for hydrogen ions and hydroxyl ions from the water in said first chamber and subjected to electrodialysis so that they are transported respectively into said catholyte and said anolyte and respectively carried by said second and first streams of water into said drain pipe with the result that the ion exchange capacity of said bed is gradually increased following closing of said valve mechanism; a device operative to effect local recirculation of the water in said first chamber through said bed; means responsive to each arresting of the flow of demineralized water through said outlet pipe following each initiation of the flow thereof for initiating operation of said device; and timing means for arresting operation of said device a time interval after operation thereof is initiated.

10. A water demineralizing system comprising a demineralizing unit including structure defining first and second and third chambers and provided with a first diaphragm as a common wall between said first and second chambers and a second diaphragm as a common wall between said first and third chambers, a porous ion exchange bed arranged in said first chamber in interposed relation with respect to said first and second diaphragms and characterized by both cation and anion exchange, an anode in said second chamber, and a cathode in said third chamber; an inlet pipe for containing a supply of raw water under pressure and connected to said first chamber; an outlet pipe for containing demineralized water under pressure and connected to said first chamber; valve mechanism for controlling the flow of demineralized water from said outlet pipe to the exterior and the flow of raw water from said inlet pipe into said first chamber and into contact with said first and second diaphragms and said bed; means for opening and for closing said valve mechanism; said bed being so constructed and arranged that the cations and the anions of the salts dissolved in the raw water are quickly exchanged by said bed respectively for hydrogen ions and hydroxyl ions carried thereby in order quickly to demineralize the raw water with the result that the ion exchange capacity of said bed is correspondingly reduced; a drain pipe; a first conduit for conducting a first stream of water as an anolyte through said second chamber into contact with said first diaphragm and said anode and thence into said drain pipe; a second conduit for conducting a second stream of water as a catholyte through said third chamber into contact with said second diaphragm and said cathode and thence into said drain pipe; valve equipment for controlling the flow of said first and second streams of water; a source of direct current; switching equipment for controlling the connection of said source to said anode and said cathode, so that upon closing of said switching equipment a direct current is conducted from said anode to said cathode through said first and second diaphragms and through the water in said first and second and third chambers, whereby said bed is subjected to ion regeneration in that the cations and the anions of the salts mentioned carried by said bed are gradually re-exchanged for hydrogen and hydroxyl ions of the water in said first chamber and subjected to electrodialysis so that they are transported respectively into said catholyte and said anolyte and respectively carried by said second and first streams of water into said drain pipe with the result that the ion exchange capacity of said bed is gradually increased following closing of said valve mechanism; and means governed by the flow of demineralized water through said outlet pipe for controlling both said valve equipment and said switching equipment.

11. The water demineralizing system set forth in claim 10; wherein said means governed by the flow of demineralized water through said outlet pipe is responsive to initiating of the flow of demineralized water through said outlet pipe for opening said valve equipment and for opening said switching equipment and responsive to arresting of the flow of demineralized water through said outlet pipe for closing said valve equipment and for closing said switching equipment.

12. A water demineralizing system comprising: a demineralizing unit including structure defining first and second and third chambers and provided with a first diaphragm as a common wall between said first and second chambers and a second diaphragm as a common wall between said first and third chambers, a porous ion exchange bed arranged in said first chamber in interposed relation with respect to said first and second diaphragms and characterized by both cation and anion exchange, an anode in said second chamber, and a cathode in said third chamber; an inlet pipe for containing a supply of raw water under pressure and connected to said first chamber; an outlet pipe for containing demineralized water under pressure and connected to said first chamber; valve mechanism for controlling the flow of demineralized water from said outlet pipe to the exterior and the flow of raw water from said inlet pipe into said first chamber and into contact with said first and second diaphragms and said bed; means for opening and for closing said valve mechanism; said bed being so constructed and arranged that the cations and the anions of the salts dissolved in the raw water are quickly exchanged by said bed respectively for hydrogen ions and hydroxyl ions carried thereby in order quickly to demineralize the raw water with the result that the ion exchange capacity of said bed is correspondingly reduced; a drain pipe; a first conduit for conducting a first stream of water as an anolyte through said second chamber into contact with said first diaphragm and said anode and thence into said drain pipe; a second conduit for conducting a second stream of water as a catholyte through said third chamber into contact with said second diaphragm and said cathode and thence into said drain pipe; valve equipment for controlling the flow of said first and second streams of water; a device operative to effect local recirculation of the water in said first chamber through said bed; means responsive to initiating of the flow of demineralized water through said outlet pipe for opening said valve equipment and responsive to arresting of the flow of demineralized water through said outlet pipe for closing said valve equipment and for initiating operation of said device; timing means for arresting operation of said device a time interval after operation thereof is initiated; and means for conducting a direct current from said anode to said cathode through said first and second diaphragm and through the water in said first and second and third chambers and through said bed, whereby said bed is subjected to ion regeneration in that the cations and the anions of the salts mentioned carried by said bed are gradually re-exchanged for hydrogen ions and hydroxyl ions from the water in said first chamber and subjected to electrodialysis so that they are transported respectively into said catholyte and said anolyte and respectively carried by said second and first streams of water into said drain pipe with the result that the ion exchange capacity of said bed is gradually increased following closing of said valve mechanism.

13. A water demineralizing unit comprising an upstanding tubular cathode, a first upstanding tubular diaphragm arranged within said cathode and spaced inwardly with respect thereto and cooperating therewith to define an upstanding catholyte chamber therebetween, a second upstanding tubular diaphragm arranged within said first diaphragm and spaced inwardly with respect thereto and cooperating therewith to define an upstanding treatment chamber therebetween, said second diaphragm also defining an upstanding anolyte chamber therein, an upstanding anode arranged within said anolyte chamber and spaced inwardly with respect to said second diaphragm, an upstanding porous ion exchange bed arranged in said treatment chamber and between said first and second diaphragms and characterized by both cation and anion exchange, an inlet pipe for containing a supply of raw water under pressure and communicating with one end of said treatment chamber, an outlet pipe for containing demineralized water under pressure and communicating with the other end of said treatment chamber, valve mechanism for controlling the flow of demineralized water from said outlet pipe to the exterior and the flow of raw water from said inlet pipe into said treatment chamber and into contact with said first and second diaphragms and said bed, means for opening and for closing said valve mechanism, said bed being so constructed and arranged that the cations and the anions of the salts dissolved in the raw water are quickly exchanged by said bed respectively for hydrogen and hydroxyl ions carried thereby in order quickly to demineralize the raw water with the result that the ion exchange capacity of said bed is correspondingly reduced, means including a first conduit connected to said inlet pipe for conducting a first stream of water into said anolyte chamber and as an anolyte into contact with said first diaphragm and said anode, means including a second conduit connected to said outlet pipe for conducting a second stream of water into said catholyte chamber and as a catholyte into contact with said second diaphragm and said cathode, a drain pipe, means including a third conduit for conducting said first stream of water from said anolyte chamber into said drain pipe, means including a fourth conduit for conducting said second stream of water from said catholyte chamber into said drain pipe, and means for conducting a direct current from said anode to said cathode through said first and second diaphragms and through the water in said three chambers named and through said bed, whereby said bed is subjected to ion regeneration in that the cations and the anions of the salts mentioned carried by said bed are gradually re-exchanged for hydrogen and hydroxyl ions of the water in said treatment chamber and subjected to electrodialysis so that they are transported respectively into said catholyte and said anolyte and respectively carried by said second and first streams of water into said drain pipe with the result that the ion exchange capacity of said bed is gradually increased following closing of said valve mechanism, each of said four conduits named being formed of insulating material so as to minimize the flow of stray electric current therethrough from said anode to said cathode.

14. The water demineralizing unit set forth in claim 13, and further comprising pump means for recirculating water from said other end of said treatment chamber to the exterior and back into said one end of said treatment chamber and thence therethrough and through and into contact with said bed.

15. A water demineralizing unit comprising an upstanding tubular cathode, a first upstanding tubular diaphragm arranged within said cathode and spaced inwardly with respect thereto and cooperating therewith to define an upstanding catholyte chamber therebetween, a second upstanding tubular diaphragm arranged within said first diaphragm and spaced inwardly with respect thereto and cooperating therewith to define an upstanding treatment chamber therebetween, said second diaphragm also defining an upstanding anolyte chamber therein, an upstanding anode arranged within said anolyte chamber and spaced inwardly with respect to said second diaphragm, an upstanding porous ion exchange bed arranged in said treatment chamber and between said first and second diaphragms and characterized by both cation and anion exchange, an inlet pipe for containing a supply of raw water under pressure and communicating with one end of said treatment chamber, an outlet pipe for containing demineralized water under pressure and communicating with the other end of said treatment chamber, valve mechanism for controlling the flow of demineralized water from said outlet pipe to the exterior and the flow of raw water from said inlet pipe into said treatment chamber and into contact with said first and second diaphragms and said bed, means for opening and for closing said valve mechanism, said bed being so constructed and arranged that the cations and the anions of the salts dissolved in the raw water are quickly exchanged by said bed respectively for hydrogen and hydroxyl ions carried thereby in order quickly to demineralize the raw water with the result that the ion exchange capacity of said bed is correspondingly reduced, a first tube having an open upper end disposed above the top of said anolyte chamber and a lower end communicating with the bottom of said anolyte chamber, a second tube having an open upper end disposed above the top of said catholyte chamber and a lower end communicating with the bottom of said catholyte chamber, means including a first conduit connected to said inlet pipe for projecting a first stream of water into the open upper end of said first tube and thus into the bottom of said anolyte chamber as an anolyte into contact with said first diaphragm and said anode, means including a second conduit connected to said outlet pipe for projecting a second stream of water into the open upper end of said second tube and thus into the bottom of said catholyte chamber as a catholyte into contact with said second diaphragm and said cathode, a drain pipe, means including a third conduit connected to the top of said anolyte chamber for conducting said first stream of water into said drain pipe, means including a fourth conduit connected to the top of said catholyte chamber for conducting said second stream of water into said drain pipe, and means for conducting a direct current from said anode to said cathode through said first and second diaphragms and through the water in said three chambers named and through said bed, whereby said bed is subjected to ion regeneration in that the cations and the anions of the salts mentioned carried by said bed are gradually re-exchanged for hydrogen and hydroxyl ions of the water in said treatment chamber and subjected to electrodialysis so that they are transported respectively into said catholyte and said anolyte and respectively carried by said second and first streams of water into said drain pipe with the result that the ion exchange capacity of said bed is gradually increased following closing of said valve mechanism, each of said four conduits named being formed of insulating material so as to minimize the flow of stray electric current therethrough from said anode to said cathode.

16. A water demineralizing unit comprising an upstanding tubular cathode, a first upstanding tubular diaphragm arranged within said cathode and spaced inwardly with respect thereto and cooperating therewith to define an upstanding catholyte chamber therebetween, a second upstanding tubular diaphragm arranged within said first diaphragm and spaced inwardly with respect thereto and cooperating therewith to define an upstanding treatment chamber therebetween, said second diaphragm also defining an upstanding anolyte chamber therein, an upstanding anode arranged within said anolyte chamber and spaced inwardly with respect to said second diaphragm, top and bottom headers respectively closing the top and bottom ends of said three chambers named, an upper insulating membrane carried by said top header and sealed to the upper ends of said cathode and said first and second diaphragms, an upper insulating and sealing plug arranged in the upper ends of said three chambers named and defining the top ends thereof, a lower insulating membrane carried by said bottom header and sealed to the lower ends of said cathode and said first and second diaphragms, a lower insulating and sealing plug arranged in the lower ends of said three chambers named and defining the bottom ends thereof, each of said membranes being formed essentially of a polymeric elastomer of rubber-like character and each of said plugs being formed essentially of a long-chain aliphatic hydrocarbon of wax-like character, an upstanding porous ion exchange bed arranged in said treatment chamber and mutually between said first and second diaphragms and between said upper and lower plugs, said bed being characterized by both cation and anion exchange, an inlet pipe for conducting raw water into one end of said treatment chamber, an outlet pipe for conducting demineralized water from the other end of said treatment chamber, valve mechanism for controlling the flow of water from said inlet pipe through said treatment chamber and into contact with said first and second diaphragms and said bed and thence into said outlet pipe, means for opening and for closing said valve mechanism, said bed being so constructed and arranged that the cations and the anions of the salts dissolved in the raw water are quickly exchanged by said bed respectively for hydrogen and hydroxyl ions carried thereby with the result that the raw water is quickly demineralized and the ion exchange capacity of said bed is correspondingly reduced, a drain pipe, means for conducting a first stream of water through said anolyte chamber as an anolyte into contact with said first diaphragm and said anode and thence into said drain pipe, means for conducting a second stream of water through said catholyte chamber as a catholyte into contact with said second diaphragm and said cathode and thence into said drain pipe, and means for conducting a direct current from said anode to said cathode through said first and second diaphragms and through the water in said three chambers named and through said bed, whereby said bed is subjected to ion regeneration in that the cations and the anions of the salts mentioned carried by said bed are gradually re-exchanged for hydrogen and hydroxyl ions of the water in said treatment chamber and subjected to electrodialysis so that they are transported respectively into said catholyte and said anolyte and respectively carried by said second and first streams of water into said drain pipe with the result that the ion exchange capacity of said bed is gradually increased following closing of said valve mechanism.

17. A water demineralizing unit comprising an upstanding tubular metal member constituting a cathode, a first upstanding tubular diaphragm arranged within said cathode and spaced inwardly with respect thereto and cooperating therewith to define an upstanding catholyte chamber therebetween, a second upstanding tubular diaphragm arranged within said first diaphragm and spaced inwardly with respect thereto and cooperating therewith to define an upstanding treatment chamber therebetween, said second diaphragm also defining an upstanding anolyte chamber therein, an upper metal header sealed to the upper ends of said cathode and said first and second diaphragms and having a substantially centrally disposed opening therein communicating with the upper end of said anolyte chamber, a lower metal header sealed to the lower ends of said cathode and said first and second diaphragms and having a substantially centrally disposed opening therein communicating with the lower end of said anolyte chamber, an upper insulating bushing sealed in the opening in said upper header, a lower insulating bushing sealed in the opening in said lower header, an upstanding anode arranged in said anolyte chamber and secured at the upper and lower ends thereof respectively to said upper and lower bushings, said upstanding anode being in the form of a plurality of upstanding substantially rod-like members arranged in substantially symmetrically spaced-apart relation and extending between said upper and lower bushings, an upstanding porous ion exchange bed arranged in said treatment chamber and between said first and second diaphragms and characterized by both cation and anion exchange, an inlet pipe for containing a supply of raw water under pressure and communicating with one end of said treatment chamber, an outlet pipe for containing demineralized water under pressure and communicating with the other end of said treatment chamber, valve mechanism for controlling the flow of demineralized water from said outlet pipe to the exterior and the flow of raw water from said inlet pipe into said treatment chamber and into contact with said first and second diaphragms and said bed, means for opening and for closing said valve mechanism, said bed being so constructed and arranged that the cations and the anions of the salts dissolved in the raw water are quickly exchanged by said bed respectively for hydrogen and hydroxyl ions carried thereby in order quickly to demineralize the raw water with the result that the ion exchange capacity of said bed is correspondingly reduced, a drain pipe, means for conducting a first stream of water through said anolyte chamber as an anolyte into contact with said first diaphragm and said anode and thence into said drain pipe, means for conducting a second stream of water through said catholyte chamber as a catholyte into contact with said second diaphragm and said cathode and into said drain pipe, and means for conducting a direct current from said anode to said cathode through said first and second diaphrams and through the water in said three chambers named and through said bed, whereby said bed is subjected to ion regeneration in that the cations and the anions of the salts mentioned carried by said bed are gradually re-exchanged for hydrogen and hydroxyl ions of the water in said treatment chamber and subjected to electrodialysis so that they are transported respectively into said catholyte and said anolyte and respectively carried by said second and first streams of water into said drain pipe with the result that the ion exchange capacity of said bed is gradually increased following closing of said valve mechanism.

References Cited in the file of this patent

UNITED STATES PATENTS

| | | |
|---|---|---|
| 2,093,770 | Billiter | Sept. 21, 1937 |
| 2,502,614 | Zender | June 17, 1944 |
| 2,763,607 | Steverman | Sept. 18, 1956 |
| 2,788,319 | Pearson | Apr. 9, 1957 |
| 2,815,320 | Kollsman | Dec. 3, 1957 |

FOREIGN PATENTS

| | | |
|---|---|---|
| 675,253 | Great Britain | July 9, 1952 |

OTHER REFERENCES

Walters et al.: Industrial and Engineering Chemistry, vol. 47, No. 1, January 1955, pages 61 to 64.